J. V. EVES.
APPARATUS FOR HACKLING AND SPREADING FLAX AND OTHER LONG STAPLE FIBERS.
APPLICATION FILED AUG. 25, 1913.
1,143,520.
Patented June 15, 1915.
7 SHEETS—SHEET 1.
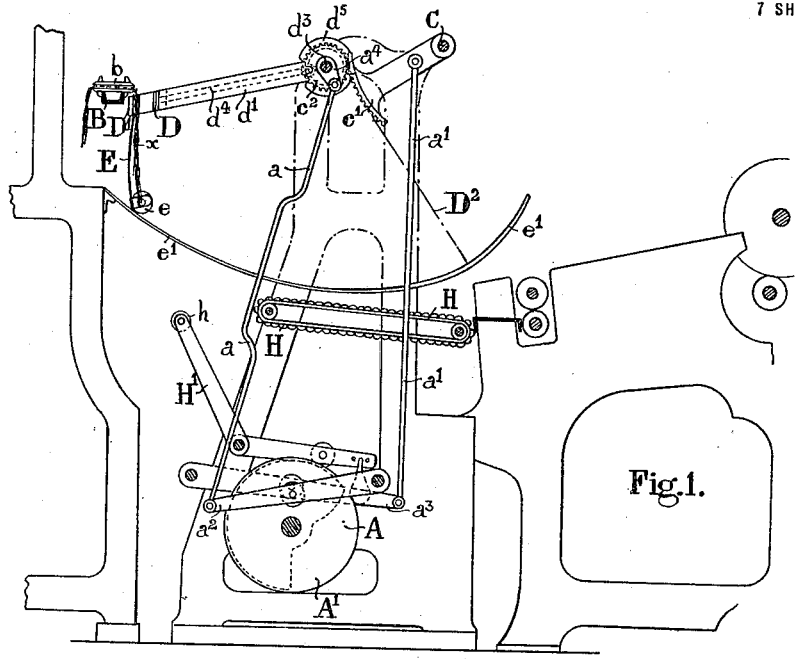
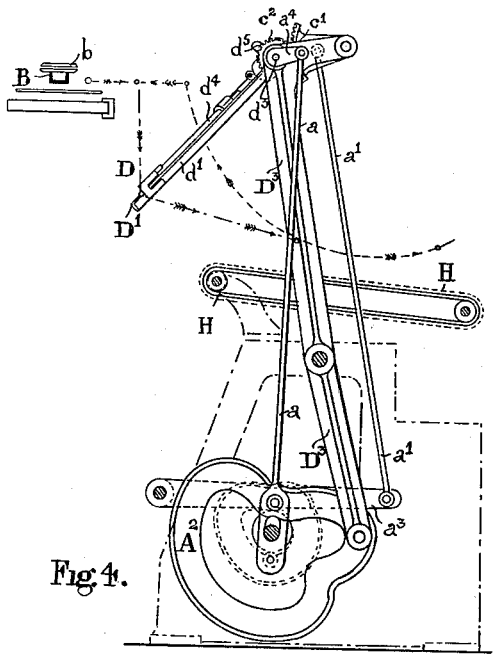
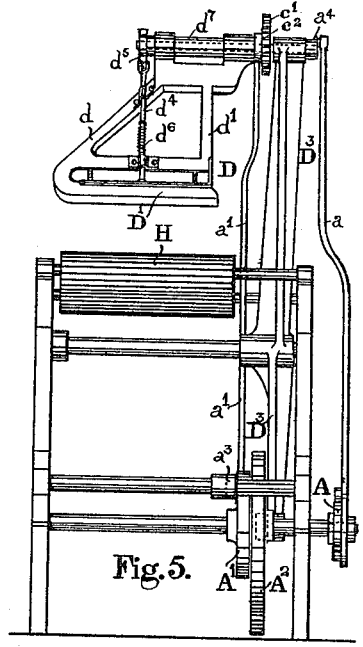
INVENTOR.
Joshua V. Eves, J. V. EVES.
APPARATUS FOR HACKLING AND SPREADING FLAX AND OTHER LONG STAPLE FIBERS.
APPLICATION FILED AUG. 25, 1913.
1,143,520.
Patented June 15, 1915.
7 SHEETS—SHEET 2.
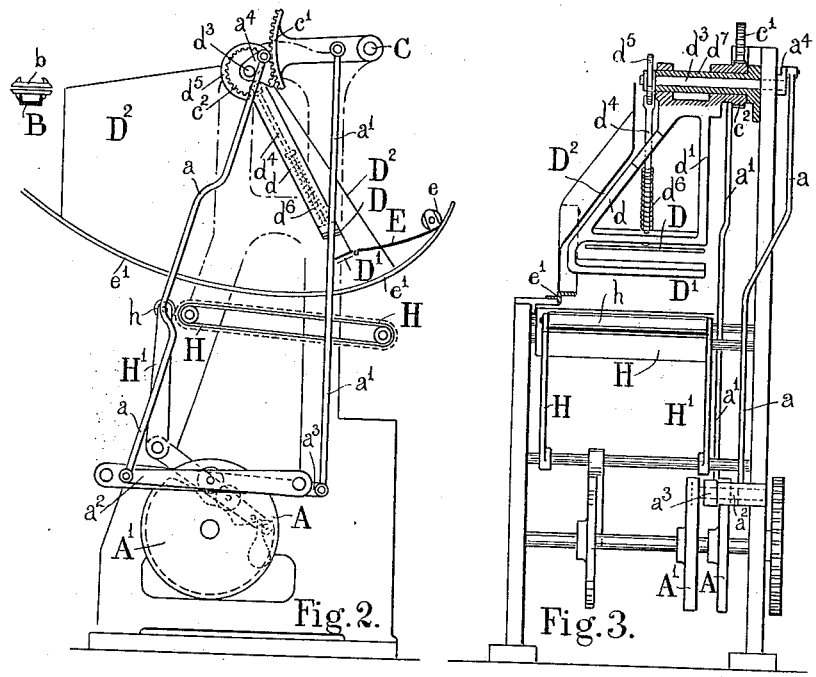
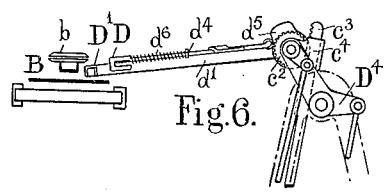
WITNESSES.
INVENTOR.
Joshua V. Eves
by
James L. Norris
Attorney.

J. V. EVES.
APPARATUS FOR HACKLING AND SPREADING FLAX AND OTHER LONG STAPLE FIBERS.
APPLICATION FILED AUG. 25, 1913.

1,143,520.

Patented June 15, 1915.
7 SHEETS—SHEET 3.

WITNESSES.

Joshua V. Eves, INVENTOR.
by
Attorney.

J. V. EVES.
APPARATUS FOR HACKLING AND SPREADING FLAX AND OTHER LONG STAPLE FIBERS.
APPLICATION FILED AUG. 25, 1913.
1,143,520.
Patented June 15, 1915.
7 SHEETS—SHEET 4.
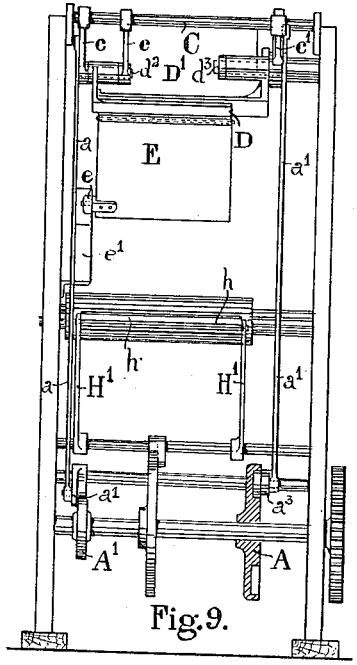
Fig. 9.
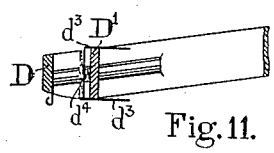
Fig. 11.
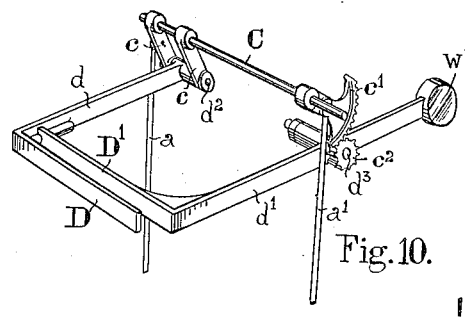
Fig. 10.
WITNESSES.
INVENTOR.
Joshua V. Eves,
by 
Attorney.

J. V. EVES.
APPARATUS FOR HACKLING AND SPREADING FLAX AND OTHER LONG STAPLE FIBERS.
APPLICATION FILED AUG. 25, 1913.
1,143,520.
Patented June 15, 1915.
7 SHEETS—SHEET 5.
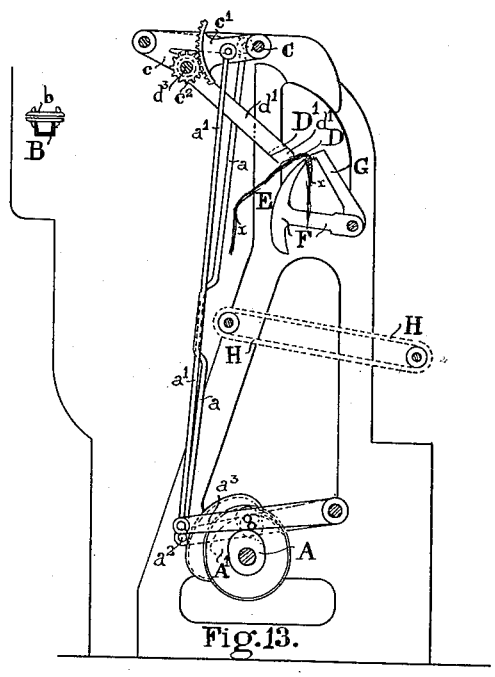
Fig. 13.
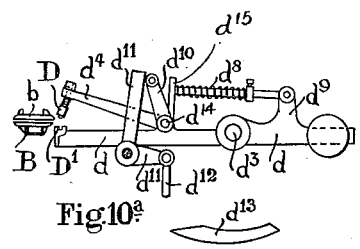
Fig. 10ª
WITNESSES.
INVENTOR.
Joshua V. Eves,
by
Attorney J. V. EVES.
APPARATUS FOR HACKLING AND SPREADING FLAX AND OTHER LONG STAPLE FIBERS.
APPLICATION FILED AUG. 25, 1913.

1,143,520.

Patented June 15, 1915.
7 SHEETS—SHEET 6.

WITNESSES.

INVENTOR.
Joshua V. Eves,
by
Attorney

J. V. EVES.
APPARATUS FOR HACKLING AND SPREADING FLAX AND OTHER LONG STAPLE FIBERS.
APPLICATION FILED AUG. 25, 1913.

1,143,520.

Patented June 15, 1915.
7 SHEETS—SHEET 7.

INVENTOR.
Joshua V. Eves,

UNITED STATES PATENT OFFICE.

JOSHUA VALENTINE EVES, OF BELFAST, IRELAND.

APPARATUS FOR HACKLING AND SPREADING FLAX AND OTHER LONG-STAPLE FIBERS.

1,143,520.  Specification of Letters Patent.  Patented June 15, 1915.

Application filed August 25, 1913. Serial No. 786,598.

*To all whom it may concern:*

Be it known that I, JOSHUA VALENTINE EVES, a British subject, residing at Belfast, county Antrim, Ireland, have invented certain new and useful Improvements in Apparatus for Hackling and Spreading Flax and other Long-Staple Fibers, of which the following is a specification.

This invention relates to apparatus by which the stricks or pieces of hackled flax are transferred from the holders of a hackling machine and delivered to a spread board or other machine such as described in U. S. Letters Patent No. 1,099,084, granted June 2, 1914, to myself and Peter Shaw.

The objects of the present improvements are to simplify the machine and reduce its parts primarily with the view of restricting the movement of the grippers which withdraw the flax from the holders by so placing them that the flax will slide vertically into the space between the two jaws and also to improve the machine in respect of other details of construction.

The invention will be described with reference to the accompanying drawings.

Figure 7:
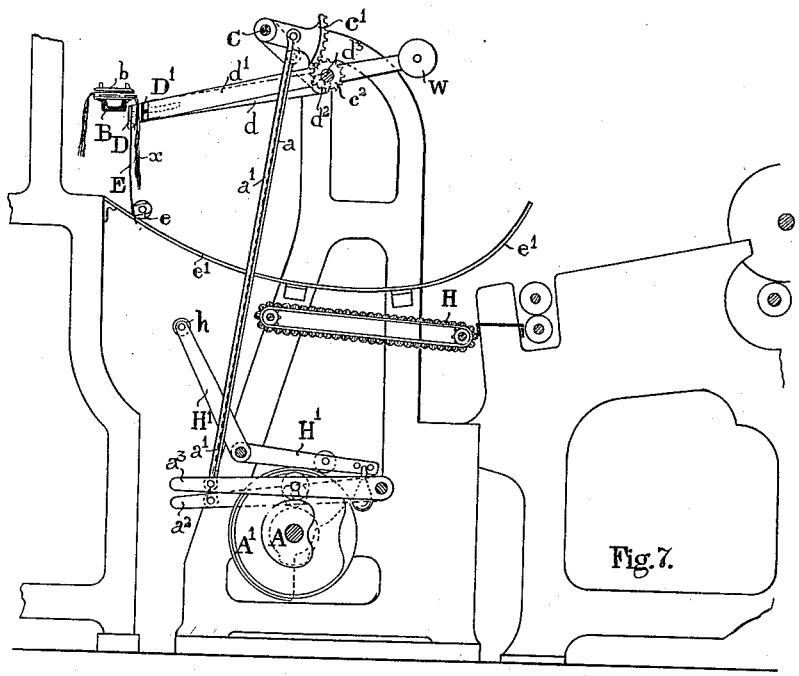
Figure 8:
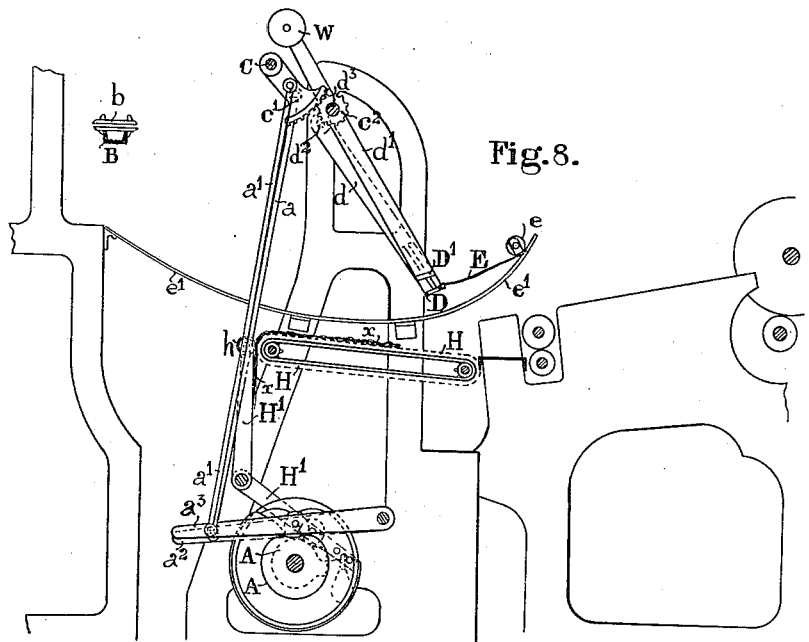
Figure 12:
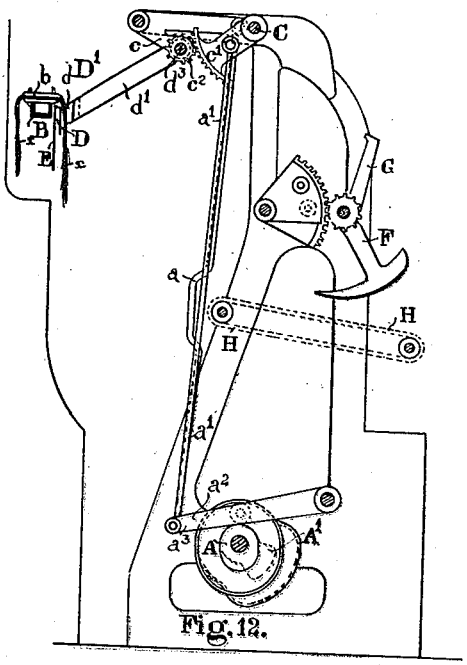
Figure 14:
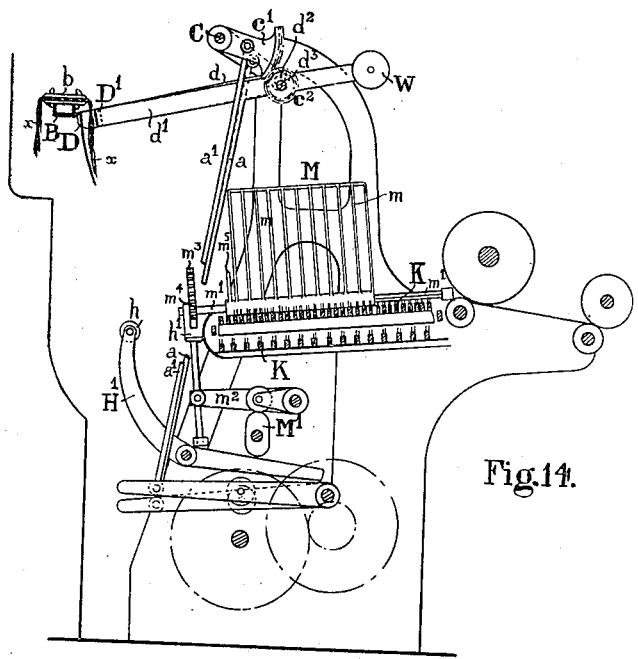
Figure 17:
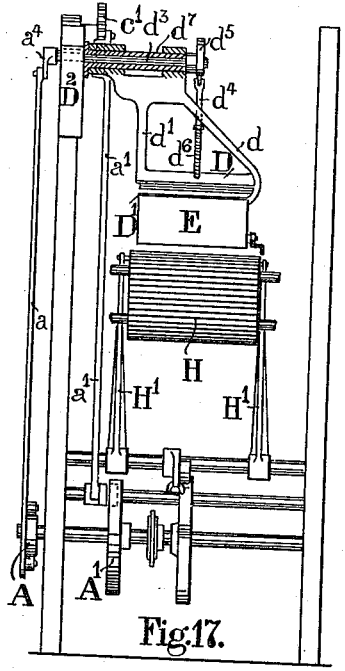
Figure 16:
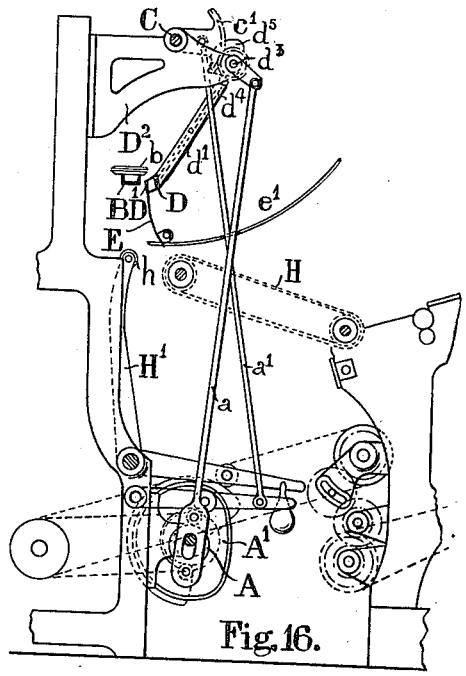
Figure 15:
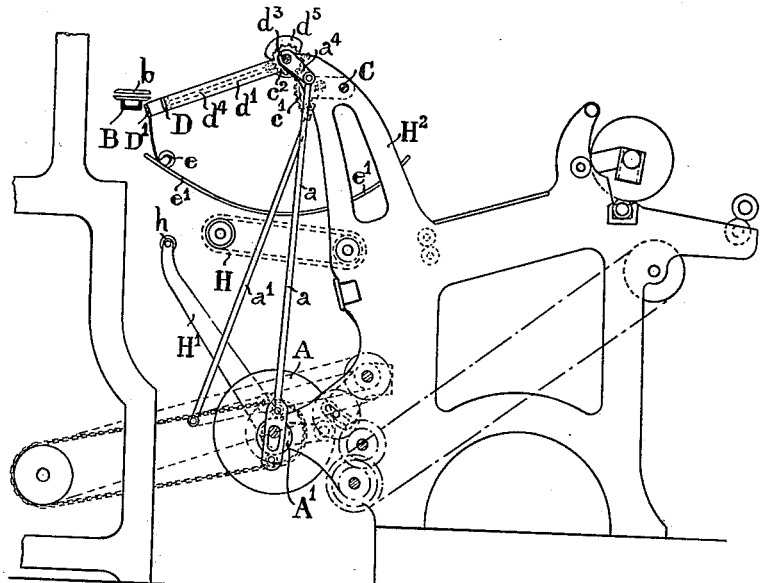

Figure 1, side elevation of one form of the automatic transfer apparatus. Fig. 2, side elevation of same showing another position of the transfer grippers. Fig. 3, back elevation of same. Fig. 4, side elevation showing similar automatic transfer apparatus carried on the end of a pivoted lever. Fig. 5, back elevation of same. Fig. 6, side elevation showing similar mechanism carried by a bell crank lever or wrist plate. Fig. 7, sectional side elevation of another form of automatic transfer machine. Fig. 8, sectional side elevation similar to Fig. 7 showing the grippers in another position. Fig. 9, back elevation of same. Fig. 10, perspective view of grippers shown in Fig. 8. Fig. 10$^a$, side elevation showing a modified construction of gripper mechanism. Fig. 11, section of same enlarged. Fig. 12, sectional side elevation of a modified arrangement. Fig. 13, sectional side elevation of same showing alternate position of parts. Fig. 14, sectional side elevation of another modification showing a bed of fallers and gills of a spread board carried under the transfer grippers. Fig. 15, side elevation showing the transferring mechanism carried by the spread board or gill frame. Fig. 16, side elevation showing the transferring mechanism suspended from the gable of the hackling machine frame. Fig. 17, end elevation of same.

The apparatus may be mounted on a separate framing, or it may be mounted on the framing of a spread board, gill frame, or other machine to which the flax is to be transferred or it may be mounted on the frame of the hackling machine from which the flax is taken.

The hackling machines, the cross channel B between two hackling machines and the holder $b$ which carries the "strick" or "piece" of flax under operation are of the ordinary construction for the well known automatic hackling machines.

The transferrer apparatus comprise two swinging or pendulous members pivoted to a suitable frame or bracket and operated by cams to grip the piece of flax $x$ and draw it forward out of the holder $b$ and transfer the flax to and lay it upon the next machine by which it is treated.

The grippers of the transfer or spreading apparatus are formed of two bars or jaws D and D′ flat or curved mounted on pendulum arms $d$ $d'$ so arranged that when at rest to receive the flax $x$ a space lies between the jaws into which the depending ends of the flax $x$ can move uninterruptedly as the holder $b$ is traversed along the cross channel B. The jaw or bar D is caused to close upon the jaw D′ to grip the flax by a sliding or rotary movement and a rotary movement is imparted to the two jaws simultaneously in a direction away from the holder $b$ to draw the flax $x$ therefrom and deliver it to the desired position. The gripper jaw or bar D′ and the supporting arms $d$ $d'$ are carried on a sleeve $d^7$ fixed to the frame at one side of the machine. The gripper bar or jaw D is also mounted upon the radial supporting arms $d$ $d'$ and is capable of sliding to and fro, a rod $d^4$ therefrom extending to a cam $d^5$ mounted on the shaft $d^3$ by which the jaw D is moved into contact with the jaw or bar D′ and moved in the reverse direction by a spring $d^6$. A toothed wheel or pinion $c^2$ is connected to the boss of the arms $d$ $d'$ and a rocking movement is imparted to the jaws D D′ by a toothed quadrant $c'$. A rotary movement is imparted to cam $d^5$ on the shaft $d^3$ to close the jaw D upon the jaw D′ to grip the flax by a suitably designed cam or eccentric A through a lever $a^2$ connecting rod $a$ and lever $a^4$ and a rocking or oscillating movement is imparted to the quadrant $c'$ by the cam $A'$ through the lever $a^3$ and connecting rod $a'$ to give the rotary movement to the grippers D D' to withdraw the flax $x$ from the holder $b$ and deliver it where desired. The grippers are opened to release the flax when the piece of flax touches the lattice or feed sheet H by the cam A and cam $d^5$ and the grippers are returned to their first position by the cam $A'$. A casing or guard $D^2$ of sheet metal may inclose the grippers and gripper arms to protect the operative from contact therewith.

To the gripper bar or jaw D' an apron E of sheet metal or other material may be hinged to support or carry forward the depending end of the flax $x$. The apron E may hang freely or may be provided with runners $e$ to traverse a guide rail or bracket $e'$.

The grippers D D' may deliver the flax $x$ to nippers G, F, (such as in Figs. 12 and 13) or direct onto the lattice H of a spreadboard or other machine, or onto the fallers K (such as in Fig. 14) of a gill-frame or other machine.

In the arrangement shown in Figs. 4 and 5 the transfer or spreading apparatus is similar to that described and mounted on the end of an upright rocking lever $D^3$ pivoted to the machine frame and operated by the cam $A^2$ to give a rectilinear movement to the jaws D D' as they recede from and approach to the flax holders $b$, the forward and backward path of the grippers being shown in dotted lines.

In the arrangement shown in Fig. 6 the pendulum arms of the transfer or spreading apparatus are mounted on a bell crank lever or wrist plate $D^4$ to give the rectilinear movement to the jaws D D' the bell crank being operated by a similar cam as shown in Fig. 4 and the pinion $c^2$ operated by a rack $c^3$ sliding in a shoe $c^4$.

In the arrangement shown in Figs. 7 to 11 the gripper bars D D' are similarly mounted on the pendulum arms $d\ d'$ to receive the piece of flax $x$. The gripper jaw or bar D and its pendulum arm $d$ are carried on a stud or pin $d^2$ by links $c$ suspended from a transverse shaft C and the gripper jaw or bar D' with its supporting arm $d'$ is carried on a pin or stud $d^3$ journaled in bearings in the frame of the machine. Upon one end of the shaft C a toothed quadrant $c'$ is affixed and to the arm $d'$ a pinion $c^2$ is connected which gears with the toothed quadrant. A connecting rod $a$ is connected to the links $c$ and a connecting rod $a'$ to the quadrant $c'$. A rocking or swinging movement is imparted to the links $c$ by a cam A through the lever $a^2$ and connecting rod $a$ to close the jaw D upon the jaw D' to grip the flax $x$ and to bring the stud or pin $d^2$ into alinement with the stud or pin $d^3$ and thereafter a rocking or oscillating movement is imparted to the quadrant $c'$ by the cam $A'$ through the lever $a^3$ and connecting rod $a'$ to give the rotary movement to the grippers D D' to withdraw the flax $x$ from the holder $b$ and deliver it where required. The grippers D D' are opened to release the flax at the end of the traverse by the cam A and the grippers are returned to their first position by the cam $A'$. The grippers are preferably counterbalanced by a weight W. To the gripper bar or jaw D an apron of sheet metal or other material may be hinged to support or carry forward the depending end of the flax $x$. The apron E may hang freely or may be provided with runners $e$ to traverse a guide rail or bracket $e'$. The grippers D D' may deliver the flax $x$ to nippers G, F (such as in Figs. 12 and 13) or direct onto the lattice H of a spreadboard or other machine or onto the fallers K (such as in Fig. 14) of a spreadboard or other machine.

In the arrangement shown in Fig. 10$^a$ the gripper bar D' is carried by the pendulum arm or frame $d$ mounted on the rocking shaft $d^3$ raised and lowered by a quadrant or otherwise in the manner hereinbefore described. The gripper bar D is carried by an arm or arms $d^4$ on a rocking shaft or stud $d^{14}$ carried in brackets on the pendulum arm or frame $d$. A spring $d^8$ acting against an extension $d^{15}$ of the arm $d^4$ forces the gripper bar D against the gripper bar D' when the flax is between them the spring $d^8$ being supported by a rod pivoted to an extension $d^9$ of the pendulum arm or frame $d$. A lever $d^{10}$ is affixed to the rocking shaft $d^{14}$ and a bell crank lever $d^{11}$ pivoted on a stud on the frame of the machine engages therewith to open the grippers to receive the flax when the pendulum arm is in the position shown. The lever $d^{11}$ is operated by a connecting rod $d^{12}$ and a cam (not shown). A stationary cam surface $d^{13}$ is bolted to the framing in the path of the lever $d^{10}$ and when the pendulum arm and grippers swing to transfer the flax from the holder $b$ the lever $d^{10}$ engages therewith opening the grippers to release the flax.

Where the grippers D D' deliver or lay the flax upon the lattice H of the spreadboard as in Figs. 1 to 9 a rocking arm H' carrying the roller $h$ is employed to nip the flax against the traveling lattice H and retain it upon the lattice as the grippers D D' open and pass forward leaving the flax behind upon the lattice.

Where the grippers D D' deliver the flax onto the fallers K of the spreadboard or other machine as in Fig. 14, the bed of fallers and gills are carried beneath the grippers and as they open the flax is laid upon the gill pins.

In the arrangement in Fig. 15 the apparatus is carried by an extension H² of the framing of the spreadboard instead of on a separate or independent framing the jaws D D' being operated by the cams A and A' and connecting rods a a' as described with reference to Figs. 1, 2 and 3.

In the arrangement in Figs. 16 and 17 the apparatus is carried by an overhanging bracket or extension d² of the gable of the hackling machine instead of on an independent framing the jaws D D' being operated by the cams A A' and connecting rods a a' as described with reference to Figs. 1, 2 and 3.

What I claim as my invention and desire to protect by Letters Patent is:—

1. In an automatic flax transferrer or spreading apparatus, a pair of grippers by which the flax is drawn from the holders comprising a pair of gripping bars, one capable of movement toward the other, pendulum arms mounted upon a common axis and carrying said bars, means for causing a rocking movement of said pendulum arms, and means for relatively moving the bars toward one another or into gripping relation at the inception of the rocking movement of said arms in one direction, and for moving said bars away from one another or into releasing relation at the inception of the return movement of said arms.

2. In automatic flax transfer or spreading apparatus a pair of grippers by which the flax is drawn from the holders comprising a gripper bar carried on pendulum arms on a stud or shaft journaled to the framing a movable jaw mounted thereon with a space between them when at rest, and means for operating the movable bar and a quadrant for imparting a rotary movement to the bars simultaneously substantially as described.

3. In automatic flax transfer or spreading apparatus a pair of grippers by which the flax is drawn from the holders comprising a gripping bar D carried on a pendulum arm d a bar D' carried on a pendulum arm d' with a space between them when at rest, links c by which the bar and its arm d are supported and a stud d³ on which the bar D' and its arm are supported, and means for operating the bars substantially as described.

4. In automatic flax transfer or spreading apparatus having grippers to seize the flax the combination of a pendulum arm carrying one gripper bar, a second pendulum arm attached to the first carrying the second gripper bar, means for swinging the arms to and fro, a spring acting in connection with the movement of the arms in one direction to cause the gripper bars to close and a lever and cam surface acting in connection with the return movement of the arms to cause the gripper bars to open.

5. In an automatic flax transferrer or spreading apparatus comprising a pair of co-acting grippers and pendulous, oscillatory supporting means therefor, an apron depending from one of said grippers to guide or direct the flax.

6. In an automatic flax transferrer or spreading apparatus having a pair of gripper bars to seize the flax, the combination of a pendulum arm carrying one of said gripper bars, a second pendulum arm attached to the first and carrying the other of said gripper bars, a spring to cause the gripper bars to close, a lever and cam surface to cause the gripper bars to open, means for oscillating said arms to and fro, and a spread board framing projecting upwardly and rearwardly to provide a bearing for the arms and extending rearwardly and laterally to provide a support for the said means.

In testimony whereof I have hereunto set my hand in presence of two subscribing witnesses.

JOSHUA VALENTINE EVES.

Witnesses:
FREDK. W. DOWNEY,
SAMUEL WIGGINS.